Dec. 30, 1941.  G. HANSEN  2,268,139
REFRACTOMETER FOR LIQUIDS
Filed Dec. 8, 1939
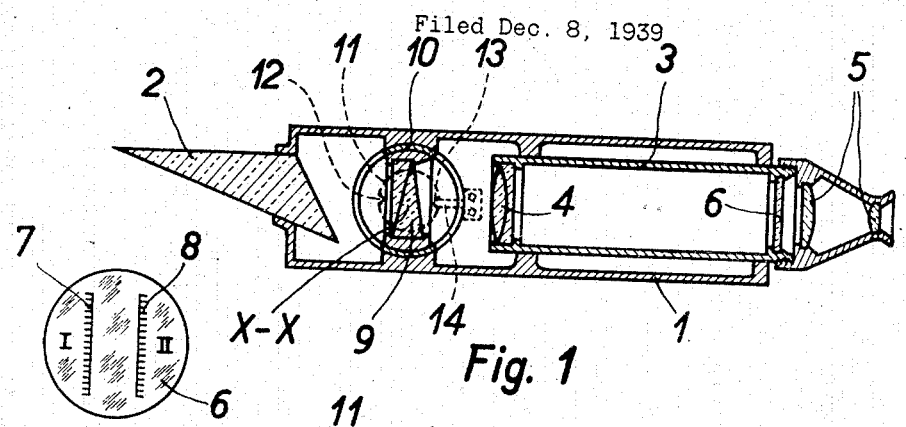
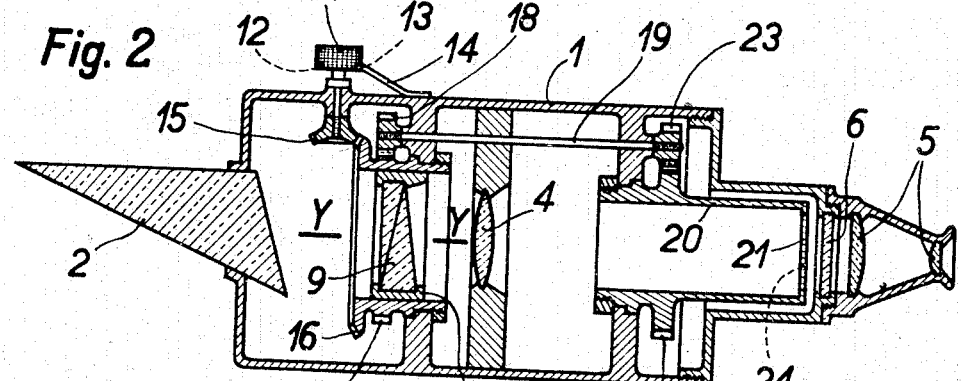
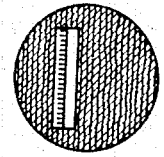
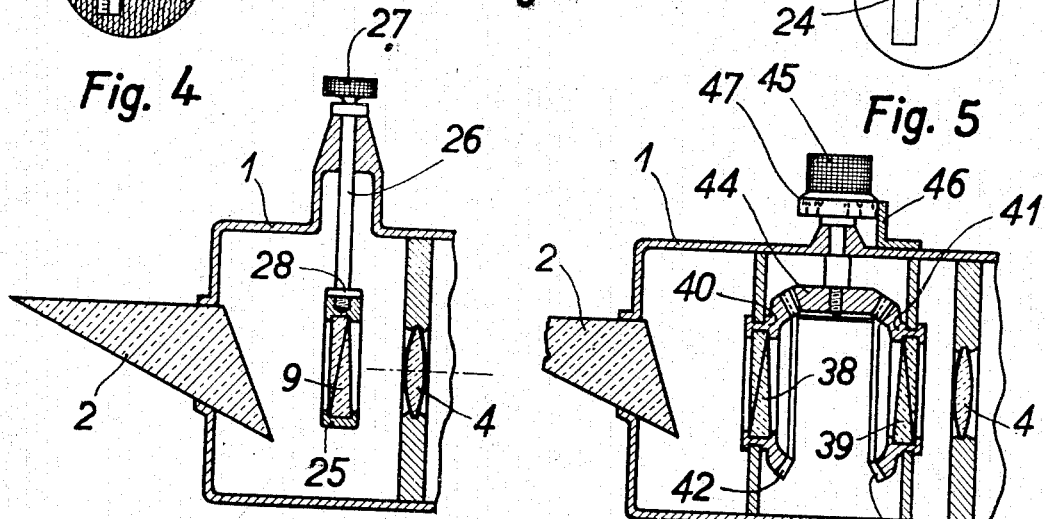
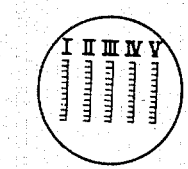
Inventor:

Patented Dec. 30, 1941

2,268,139

UNITED STATES PATENT OFFICE 2,268,139

REFRACTOMETER FOR LIQUIDS

Gerhard Hansen, Jena, Germany, assignor to the firm Carl Zeiss, Jena, Germany

Application December 8, 1939, Serial No. 308,153
In Germany December 24, 1938

5 Claims. (Cl. 88—14)

An application has been filed in Germany, December 24, 1938.

The present invention refers to a refractometer for the investigation of liquids, provided with a scale which is installed in the telescope behind the measuring prism and permits a reading to be taken of a value corresponding with the position of the boundary line of the total reflexion effected by the liquid under investigation, such as for instance of the refractive index of the liquid in question.

In refractometers of this kind it frequently happens that the field of view of the observation telescope is not large enough to render visible the full length of the scale corresponding with the measuring range of the refractometer.

According to the present invention this deficiency is met by the employment of a scale consisting of a plurality of adjoining parts each of which belongs to one of a plurality of parts of the measuring range, and by the provision of means which, by changing the inclination of the pencil of rays emerging from the measuring prism, make it possible to successively render said parts of the measuring range accessible to measurement.

The change in the inclination of the pencil of rays is suitably effected by means of a system of achromatic glass wedges, which can be made in several forms. In the event of a subdivision of the measuring range into two parts being intended, corresponding to two adjoining scale parts, alternation between two positions of the pencil of rays is possible, one of these positions being available when the system of wedges is interposed and the other position when the system of wedges is cut out. Two different positions of the pencil of rays can also be brought about in that the system of wedges is used in two different positions. If the change between these two positions is intended to be brought about by a rotation of the system of wedges about a suitably disposed axis, such as the telescope axis for instance, a changing device requiring little room will be obtained. Where a subdivision of the measuring range is required into more than two parts, provision is to be made for a changing device permitting the interposition of different systems of wedges. When the known type of compensator, consisting of two systems of wedges rotatable against each other, is used each of the scale-parts answering the different parts of the measuring range, corresponds with a definitely given position of the compensator.

It is recommendable to couple the means of changing the inclination of the pencil of rays emerging from the measuring prism with means for making those parts of the scale not required in the measurement.

In Figs. 1 and 3 of the annexed drawing two constructional examples are shown of the subject of the invention with two scale parts, giving a sectional view through the optical axis of the said invention. Fig. 2 affords a view on an enlarged scale upon the graticule of the refractometer illustrated in Fig. 1 and Fig. 5 affords a view on an enlarged scale upon the blind of the refractometer illustrated in Fig. 3. Fig. 4 shows the image presented to an observer through the refractometer illustrated in Fig. 3. In Figs. 6 and 7 a part of two other constructional examples of a refractometer according to the invention is shown in a sectional view through the optic axis, the scale of the refractometer illustrated in Fig. 6 having two parts, as illustrated in Fig. 2, the scale of the refractometer illustrated in Fig. 7 having five parts. Fig. 8 affords a view on an enlarged scale upon the graticule of the telescope of the refractometer illustrated in Fig. 7.

The refractometer shown in Fig. 1 comprises a housing 1, wherein a measuring prism 2 and an observation telescope 3 are permanently disposed. The telescope 3 is equipped with an objective 4, an ocular 5 and with a graticule 6, which is provided with two scales 7 and 8 (cf. Fig. 2), the first of which bears the designation I and the latter the designation II. To the housing 1 an achromatic wedge 9 is fitted by means of a cylindrical mount 10, said wedge being rotatable about an axis X—X intersecting the optical axis of the objective 4 at right angles. The mount 10 can be rotated by means of pinion head 11. Pinion head 11 is provided with two notches 12 and 13 each of which serves to hold wedge 9 in one of two positions by means of a spring 14 attached to housing 1. The angles by which the pencil of rays emerging from the measuring prism 2 in the two said positions inclines towards the optical axis of the objective 4 are oppositely the same. The relation between the angles of the wedge and the scales 7 and 8 is such that the boundary line of the total reflexion for the liquid under investigation indicates the refractive index of the liquid on scale 7, designated I, for one of the said positions of wedge 9 and on scale 8, designated II, for the other position of wedge 9. To prevent any misunderstanding as to which of the two scales 7 and 8 must be consulted, the two marks I and II are so engraved on the pinion head 11 (above the two notches 12 and 13) that scale 7, designated I, must be read when the spring 14 engages notch 12 marked I, and that scale 8, designated II, must be read when the spring 14 engages in notch 13 marked II. The drawing illustrates that particular position of wedge 9 where spring 14 engages the notch 13.

Compared with the aforegoing, the refractometer illustrated in Fig. 3 embodies the following alterations: The cylindrical mount 10 of wedge 9 fitted to housing 1 is rotatable about an axis Y—Y coinciding with the optical axis of objective 4. Pinion head 11 is permanently connected with a bevel gear 15 engaging the bevel gearing of mount 10. A spur gearing 17 of mount 10 is engaged by a pinion 18 attached to a shaft 19. The said shaft 19 is rotatably disposed on housing 1 in such a way that its axis of rotation runs parallel with the axis Y—Y. On housing 1 also a tubular sleeve 20 is rotatably disposed about an axis coinciding with the axis Y—Y, and is at its end provided with a bottom 21. To the tube sleeve 20 a spur gearing 22 of the same pitch circle diameter as the spur gearing 17 is fitted. A pinion 23, which is fastened to shaft 19 and whose pitch circle diameter corresponds with that of pinion 18, meshes with the spur gearing 22. The bottom 21 is provided with a lateral slot 24 (cf. Fig. 4) which is so located that scale 7 will be rendered visible for observation when the spring 14 engages notch 12, whilst scale 8 will be rendered visible when the spring 14 engages notch 13, so that the scale not required is masked.

The only difference between the two refractometers according to Figs. 6 and 7 and according to Fig. 1 consists in the wedge arrangement. In the refractometer according to Fig. 6 the achromatic wedge 9 is seated in a mount 25 which, by means of a square pin 26, is displaceably disposed on housing 1 perpendicular to the optic axis of the objective 4 of the observation telescope whose remaining parts are not shown in the drawing. To displace the square pin 26 the latter must be held by head 27. By displacing it relatively to the housing 1 the wedge can be shifted into two limiting positions one of which is illustrated in the drawing. In this illustrated position the head 27 rests on the housing 1. In the other limiting position a shoulder 28 of the pin 26 rests on the housing 1. Of two scales, not visible in Fig. 6, which are of the same kind as the scales 7 and 8 of Fig. 2 and which lie in the image plane of the eyepiece of the observation telescope, one is to be used for reading in the one limiting position of the wedge 9 and the other in the other limiting position of the said wedge.

As regards the refractometer according to Fig. 7 two glass wedges 38 and 39 are provided for, whose mounts 40 and 41 in housing 1 are rotatably disposed about the optic axis of objective 4 and equipped with bevel gear tooth systems 42 and 43 engaging a bevel gear wheel 44, the ratio of transmission being such that a rotation of the bevel gear wheel 44 by 300° results in the wedges 38 and 39 being rotated by 180° in opposite directions. The bevel gear wheel 44 can be rotated by means of a driving knob 45. On a scale 47 of the driving knob 45 a pointer 46 of housing 1 indicates the relative positions of the wedges 38 and 39. The scale 47 contains five graduation lines which in succession correspond to angles of 0°, of 75°, of 150°, of 225° and of 300°. Corresponding to the five positions of driving head 45 according to these graduation lines are five positions of wedges 38 and 39 with rotation angles of 0°, 45°, 90°, 135° and 180°. The drawing illustrates the positions of driving head 45 and of the wedges 38 and 39, which correspond to angle 0°. At a position corresponding to an angle of 150° for the driving head and of 90° for the wedges, the relative position of the surfaces of the wedges is such that the total effect of the wedges only amounts to that of a planoparallel glass plate. The refractometer is equipped with a scale of five sections I, II, III, IV and V, as illustrated in Fig. 8. Depending upon whether the first, second, third, fourth or fifth of the said positions is set, either section I, section II, section III, section IV or section V of the scale must be used for the reading.

I claim:

1. A refractometer for examining liquids, comprising a telescope, a measuring prism disposed in front of said telescope and adapted to produce the boundary line of the total reflexion of a liquid which, for examination, has been brought into contact with the measuring surface of said prism, movable optical members for changing the inclination of the ray beam emerging from said prism, means for moving said optical members from one of a plurality of positions into another and thus, for the purpose of enlarging the measuring field of the refractometer, enabling that one after the other of a plurality of equal parts of the measuring field may be brought into the field of view of said telescope, a scale disposed in an image plane of said telescope and adapted to be used for the determination of the position of the boundary line of the total reflexion of the liquid to be examined, said scale comprising as many parts as there are said positions of said optical members, said scale parts being parallel to each other and to the principal section of said prism, each scale part corresponding to one part of the measuring field, which lies within or outside the field of view of said telescope, according to the actual position of said optical members.

2. A refractometer for examining liquids, comprising a telescope, a measuring prism disposed in front of said telescope and adapted to produce the boundary line of the total reflexion of a liquid which, for examination, has been brought into contact with the measuring surface of said prism, means for holding said telescope and said prism in permanent connection with each other, an achromatic system of glass wedges for changing the inclination of the ray beam emerging from said prism, said system being rotatably disposed on said holding means behind said prism, means for rotating said system relatively to said holding means from one of two positions into the other and thus, for the purpose of enlarging the measuring field of the refractometer, enabling that alternately one or the other of two parts of the measuring field may be brought into the field of view of said telescope, means for securing said system in said two positions, a scale disposed in an image plane of said telescope and adapted to be used for the determination of the position of the boundary line of the total reflexion of the liquid to be examined, said scale comprising two parts parallel to one another and to the principal section of said prism, each scale part corresponding to one part of the measuring field, which lies within or outside the field of view of said telescope, according to the actual position of said system of wedges.

3. A refractometer for examining liquids, comprising a telescope, a measuring prism disposed in front of said telescope and adapted to produce the boundary line of the total reflexion of a liquid, which, for examination, has been brought into contact with the measuring surface of said prism, means for holding said telescope and said prism in permanent connection with each other, an achromatic system of glass wedges for changing the inclination of the ray beam emerging from said prism, said system being displaceably disposed on said holding means behind said prism, means for displacing said system relatively to said holding means from a position of rest, in which it lies outside the path of rays of the refractometer, into a position for use, in which it lies within said path of rays, a scale disposed in an image plane of said telescope and adapted to be used for the determination of the position of the boundary line of the total reflexion of the liquid to be examined, said scale comprising two parts parallel to one another and to the principal section of said prism, one scale part corresponding to that part of the measuring field of the refractometer which coincides with the field of view of said telescope when said system of wedges is in its position of rest and the other scale part corresponding to that part of the measuring field of the refractometer which coincides with the field of view of said telescope when said system of wedges is in its position for use.

4. A refractometer for examining liquids, comprising a telescope, a measuring prism disposed in front of said telescope and adapted to produce the boundary line of the total reflexion of a liquid, which, for examination, has been brought into contact with the measuring surface of said prism, means for holding said telescope and said prism in permanent connection with each other, two equal achromatic systems of glass wedges for changing the inclination of the ray beam emerging from said prism, said two systems being disposed on said holding means behind said prism for rotation about an axis coinciding with the optic axis of said telescope, means for rotating said two systems relatively to said holding means in opposite senses of rotation through equal angles and thus, for the purpose of enlarging the measuring field of the refractometer, enabling that one after the other of a plurality of parts of the measuring field may be brought into the field of view of said telescope, a device for indicating those positions of said two systems of wedges which correspond to the different parts of the measuring field, which, successively, can be brought into the field of view of said telescope, a scale disposed in an image plane of said telescope and adapted to be used for the determination of the position of the boundary line of the total reflexion of the liquid to be examined, said scale comprising as many parts as there are said positions of said two systems of wedges, said scale parts being parallel to each other and to the principal section of said prism, each scale part corresponding to one part of the measuring field, which lies within or outside the field of view of said telescope, according to the actual position of said two systems of wedges.

5. A refractometer for examining liquids, comprising a telescope, a measuring prism disposed in front of said telescope and adapted to produce the boundary line of the total reflexion of a liquid which, for examination, has been brought into contact with the measuring surface of said prism, movable optical members for changing the inclination of the ray beam emerging from said prism, means for moving said optical members from one of a plurality of positions into another and thus, for the purpose of enlarging the measuring field of the refractometer, enabling that one after the other of a plurality of equal parts of the measuring field may be brought into the field of view of said telescope, a scale disposed in an image plane of said telescope and adapted to be used for the determination of the position of the boundary line of the total reflexion of the liquid to be examined, said scale comprising as many parts as there are said positions of said optical members, said scale parts being parallel to each other and to the principal section of said prism, each scale part corresponding to one part of the measuring field, which lies within or outside the field of view of said telescope, according to the actual position of said optical members, a blind having a slot the dimensions of which correspond to the dimensions of one of said scale parts, said blind being disposed for movement relative to said telescope, means for coupling said blind to said optical members and ensuring in each of said positions of said optical members that that scale part is visible through said slot which corresponds to the part of the measuring field actually lying within the field of view of said telescope.

GERHARD HANSEN.